(12) United States Patent
Nakata

(10) Patent No.: US 6,879,877 B2
(45) Date of Patent: Apr. 12, 2005

(54) METHOD AND APPARATUS FOR PRODUCING OPERATION SIGNALS FOR A MOTION OBJECT, AND PROGRAM PRODUCT FOR PRODUCING THE OPERATION SIGNALS

(75) Inventor: Toru Nakata, Tokyo (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 201 days.

(21) Appl. No.: 10/243,662

(22) Filed: Sep. 16, 2002

(65) Prior Publication Data

US 2003/0060932 A1 Mar. 27, 2003

(30) Foreign Application Priority Data

Sep. 17, 2001 (JP) ........................................ 2001-281764

(51) Int. Cl.[7] ............................................... G06F 19/00
(52) U.S. Cl. ........................ 700/245; 700/246; 700/247; 700/248; 700/249; 700/250; 700/253; 700/262; 901/1; 901/29
(58) Field of Search ................................ 700/245, 246, 700/247, 248, 249, 250, 253, 257, 260, 261, 262; 318/800; 901/1, 29

(56) References Cited

U.S. PATENT DOCUMENTS

| | | | |
|---|---|---|---|
| 6,381,515 B1 * | 4/2002 | Inoue et al. | 700/245 |
| 6,442,450 B1 * | 8/2002 | Inoue et al. | 700/245 |
| 6,484,068 B1 * | 11/2002 | Yamamoto et al. | 700/245 |
| 6,567,724 B2 * | 5/2003 | Yamamoto | 700/261 |
| 6,594,551 B2 * | 7/2003 | McKinney et al. | 700/258 |
| 6,615,109 B1 * | 9/2003 | Matsuoka et al. | 700/245 |
| 6,708,081 B2 * | 3/2004 | Yoshida | 700/245 |

FOREIGN PATENT DOCUMENTS

JP 2001-34305 2/2001

OTHER PUBLICATIONS

Mali et al., Metrrics for evaluation of behavior–based robotic systems, 1998, IEEE, pp, 1122–1127.*
Li, Perception–action behavior control of a mobile robot in uncertain environments using fuzzy logic, 1994, IEEE, pp. 439–446.*
Loupe et al., Using Rule induction for prediction of self–injuring behavior in animal model of development disabilities, 2001, IEEE, pp, 171–176.*
Ho, A model of fuzzy emotion and behaviour selection for an autonomous mobile robot, 1997, IEEE, pp. 332–337.*
Breazeal et al., Infant–like social interactions between a robot and a human caregiver, 1998, Internet, pp. 1–57.*
Thrum et al., Probabilistic algorithms and the interactive museum tour–guide robot Minerva, 2000, Internet, pp. 1–35.*
Nkata et al., Producing animal–like and friendly impression on artifacts adn analyzing their effect on human behavioral attitudes, 1999, IEEE, pp, 1035–10040.*
Hasegawa et al., Continous locomotion of brachiatiion robot by behavior phrase shift, 2001, IEEE, pp. 2411–2416.*

* cited by examiner

Primary Examiner—Thomas G. Black
Assistant Examiner—McDieunel Marc
(74) Attorney, Agent, or Firm—Oblon, Spivak, McClelland, Maier & Neustadt, P.C.

(57) ABSTRACT

A method and apparatus for providing a motion object with psychological and emotional expressions characterized by simplified processing and reduced control data associated with controlling a series of motions for body groups of the motion object including a fundamental control signal made up of an oscillating numerical value signal representing a psychological state, and a signal representing a body-group motion sequence.

8 Claims, 9 Drawing Sheets

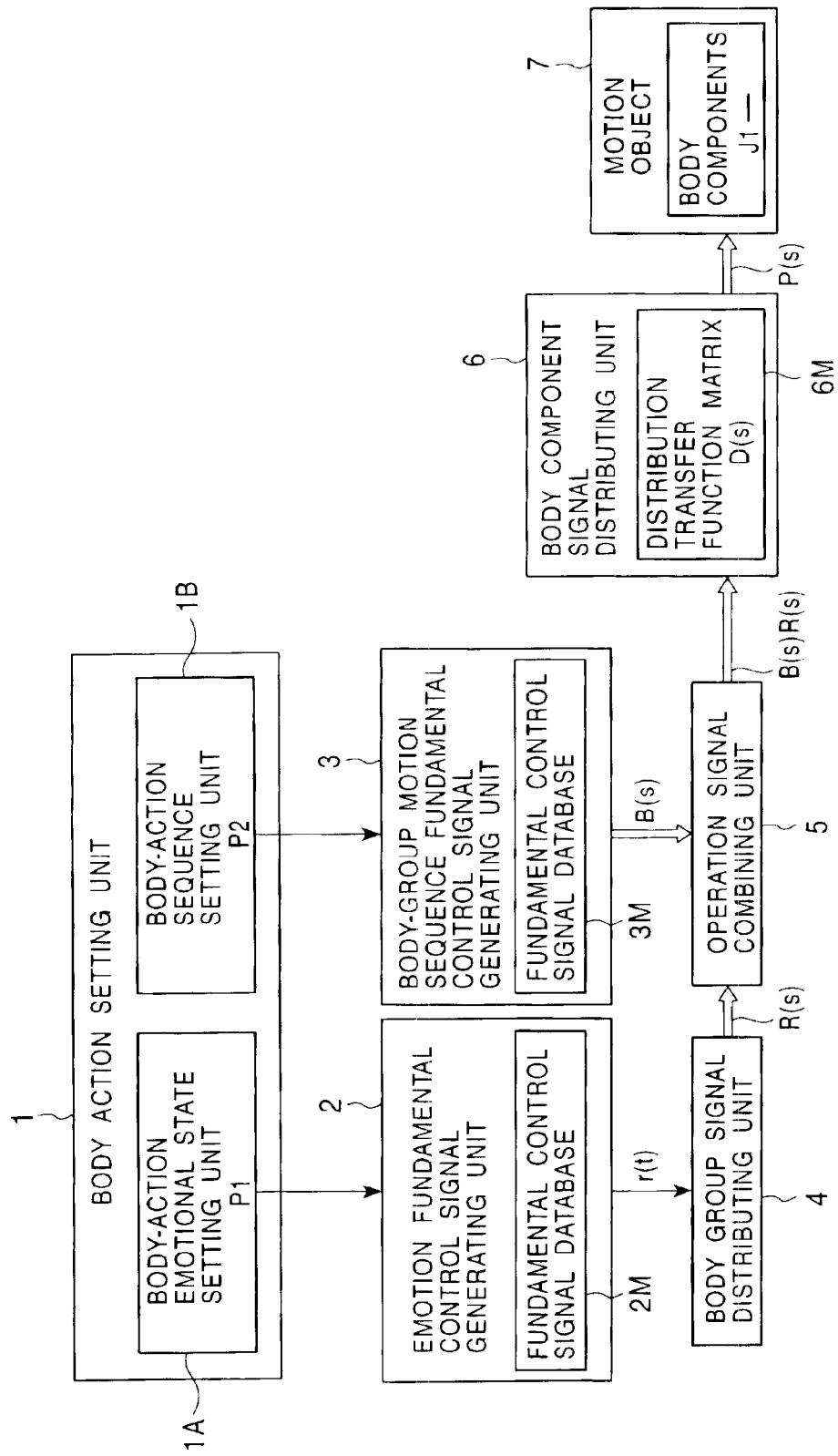

FIG. 2

| BODY-ACTION EMOTIONAL STATE (TONUS RHYTHM) P1 | | FUNDAMENTAL CONTORL SIGNAL | |
|---|---|---|---|
| 1 | SAFETY | r1 | SMALL-AMPLITUDE SHORT-WAVELENGTH SINUSOIDAL WAVE |
| 2 | CAUTION | r2 | SMALL-AMPLITUDE SHORT-WAVELENGTH TRIANGULAR WAVE |
| 3 | EAGER FOR MOVEMENT | r3 | SMALL-AMPLITUDE SHORT-WAVELENGTH SINUSOIDAL WAVE + DRIFT TERM (WAVE) |
| 4 | CONCENTRATION | r4 | LARGE-AMPLITUDE LONG-WAVELENGTH RECTANGULAR WAVE |
| 5 | INTENT TO CONTINUE STATE | r5 | DRIFT TERM (WAVE) |
| 6 | ACTIVE | r6 | SMALL-AMPLITUDE LONG-WAVELENGTH RECTANGULAR WAVE |
| 7 | FEEL PLEASURE | r7 | SMALL-AMPLITUDE LONG-WAVELENGTH SINUSOIDAL WAVE |
| 8 | PATIENT | r8 | LONG-AMPLITUDE LONG-WAVELENGTH SINUSOIDAL WAVE |
| 9 | EXCITING | r9 | LARGE-AMPLITUDE SHORT-WAVELENGTH SINUSOIDAL WAVE |
| 10 | HOSTILE FEELING | r10 | LARGE-AMPLITUDE SHORT-WAVELENGTH TRIANGULAR WAVE |

FIG. 3

| BODY ACTION SEQUENCE P2 | | | BODY-GROUP MOTION SEQUENCE FUNDAMENTAL CONTROL SIGNAL | |
|---|---|---|---|---|
| | EVOLUTION STAGE ATTRIBUTE | GROWTH STAGE ATTRIBUTE | | |
| 1 | MULTICELLULAR ORGANISM | EARLY PERIOD OF UNBORN BABY | B1 | BREATH |
| 2 | SYMMETRICAL ANIMAL | LATTER PERIOD OF UNBORN BABY | B2 | CORE-SUPPORT |
| 3 | FISHES AND INSECTS | NEWBORN BABY | B3 | SPINAL |
| 4 | AMPHIBIANS | 6 MONTHS AFTER BIRTH | B4 | UPPER-LOWER |
| 5 | REPTILES | 1 YEAR AFTER BIRTH | B5 | HOMO-LATERAL |
| 6 | MAMMALIANS | 2 YEARS AFTER BIRTH | B6 | CONTRA-LATERAL |

FIG. 5

| BODY GROUP / BODY-GROUP MOTION SEQUENCE | G1 HEAD FLEXOR | G2 LEFT SHOULDER FLEXOR | G3 RIGHT SHOULDER FLEXOR | G4 LEFT LEG FLEXOR | G5 RIGHT LEG FLEXOR | G6 TAIL FLEXOR |
|---|---|---|---|---|---|---|
| B1 BREATH | 1 OR -1 | 1 OR -1 | 1 OR -1 | 1 OR -1 | 1 OR -1 | 1 OR -1 |
| B2 CORE-SUPPORT | 1 | 1 | 1 | 1 | 1 | 1 |
| B3 SPINAL | 1 | $e^{-\Delta rs}$ | $e^{-\Delta rs}$ | $e^{-2\Delta rs}$ | $e^{-2\Delta rs}$ | $e^{-2\Delta rs}$ |
| B4 UPPER-LOWER | 1 | 1 | 1 | -1 | -1 | -1 |
| B5 HOMO-LATERAL | 0 | 1 | -1 | 1 | -1 | 0 |
| B6 CONTRA-LATERAL | 1 | -1 | -1 | -1 | 1 | 0 |

$e^{-\Delta rs}$ REPRESENTS A SIGNAL PROCESSING STEP CAUSING A TIME DELAY OF $\Delta \tau$ IN TERMS OF LAPLACE TRANSFORMED FUNCTION

FIG. 6

| JOINT | BODY COMPONENT | | CONTROL MODE OF BODY COMPONENT | DISTRIBUTION MATRIX D(s) OF OPERATION SIGNALS TO BODY COMPONENTS | | | | | |
|---|---|---|---|---|---|---|---|---|---|
| | | | | G1 HEAD | G2 LEFT SHOULDER | G3 RIGHT SHOULDER | G4 LEFT LEG | G5 RIGHT LEG | G6 TAIL |
| J1 | HEAD | 1 | HEAD NODDING | 1 | 0 | 0 | 0 | 0 | 0 |
| | | 2 | HEAD TILTING | 0 | 1 | -1 | 0 | 0 | 0 |
| J2 | LEFT UPPER ARM | 3 | LEFT UPPER ARM INTERNAL ROTATION | 0.5 | 1 | 0 | 0 | 0 | 0 |
| | | 4 | LEFT UPPER ARM RAISING | 0 | -1 | 0 | 0 | 0 | 0 |
| J3 | LEFT FOREARM | 5 | LEFT FOREARM INTERNAL ROTATION | 0.5 | 1 | 0 | 0 | 0 | 0 |
| | | 6 | LEFT FOREARM RAISING | 0 | 1 | 0 | 0 | 0 | 0 |
| J4 | RIGHT UPPER ARM | 7 | RIGHT UPPER ARM INTERNAL ROTATION | 0.5 | 0 | 1 | 0 | 0 | 0 |
| | | 8 | RIGHT UPPER ARM RAISING | 0 | 0 | -1 | 0 | 0 | 0 |
| J5 | RIGHT FOREARM | 9 | RIGHT FOREARM INTERNAL ROTATION | 0.5 | 0.5 | 1 | 0 | 0 | 0 |
| | | 10 | RIGHT FOREARM RAISING | 0 | 0 | 1 | 0 | 0 | 0 |
| J6 | WAIST | 11 | WAIST BENDING | 1 | 0 | 0 | 0 | 0 | 0 |
| | | 12 | WAIST TILTING | 0 | 1 | -1 | 0 | 0 | 0 |
| J7 | PROXIMAL TAIL | 13 | PROXIMAL TAIL INTERNAL ROTATION | 0 | 0 | 0 | 0 | 0 | 1 |
| | | 14 | PROXIMAL TAIL LATERAL SWING | 0 | 0 | 0 | 0 | 0 | 0 |
| J8 | DISTAL TAIL | 15 | DISTAL TAIL INTERNAL ROTATION | 0 | 0 | 0 | 0 | 0 | 1 |
| | | 16 | DISTAL TAIL LATERAL SWING | 0 | 0 | 0 | 0 | 0 | 0 |
| J9 | LEFT THIGH | 17 | LEFT THIGH INTERNAL ROTATION | 0 | 0 | 0 | 1 | 0 | 0.5 |
| | | 18 | LEFT THIGH RAISING | 0 | 0 | 0 | 1 | 0 | 0 |
| J10 | LEFT LEG | 19 | LEFT LEG INTERNAL ROTATION | 0 | 0 | 0 | 1 | 1 | 0.5 |
| | | 20 | LEFT LEG RAISING | 0 | 0 | 0 | -1 | -1 | 0 |
| J11 | RIGHT THIGH | 21 | RIGHT THIGH INTERNAL ROTATION | 0 | 0 | 0 | 0 | 1 | 0.5 |
| | | 22 | RIGHT THIGH RAISING | 0 | 0 | 0 | 0 | 1 | 0 |
| J12 | RIGHT LEG | 23 | RIGHT LEG INTERNAL ROTATION | 0 | 0 | 0 | 0 | 1 | 0.5 |
| | | 24 | RIGHT LEG RAISING | 0 | 0 | 0 | 0 | 0 | 0 |

METHOD AND APPARATUS FOR PRODUCING OPERATION SIGNALS FOR A MOTION OBJECT, AND PROGRAM PRODUCT FOR PRODUCING THE OPERATION SIGNALS

BACKGROUND OF THE INVENTION

1. Field of the Invention

The present invention relates to a method of producing operation signals used to operate an object such as a robot or a character appearing in video games, which has a body analogous to the body of a human being or an animal and performs body actions for viewing by people, (hereinafter referred to as a "motion object"), so that the object automatically behaves with natural and living creature-like actions in a manner giving emotional expressions as well. Also, the present invention relates to an apparatus for producing operation signals for the motion object, and a program product for producing the operation signals.

2. Description of the Related Art

A series of body actions of a motion object (robot) are controlled by outputting operation signal commands to actuators of the motion object. Hitherto, body operation signals for conventional robots and video game characters have been mostly produced using any of the following methods.

(1) Method of Copying Motions of a Real Human Being or Animal

This method is represented by a motion capture system. Specifically, a motion object is operated so as to follow captured motions of a real human being or animal, thereby giving natural feeling and emotional expressions to the motions of the object.

(2) Method of Manually Creating Action Data

In many cases, action data of a motion object is created beforehand by game designers and other persons.

(3) Method of not Intending Impression Production and Artistic Effects of Motions with Direct Purpose As an alternative method, motions are designed to achieve another purpose instead of an explicit purpose for causing a motion object to behave like a living body with emotional expressions. There is also a method of creating motions in an automatic manner. For example, motions of forelegs and hind legs of a four-footed robot are automatically enlarged to increase amounts of advance. Those artificial motions for practical purpose are eventually very similar to motions of actual animals in some cases when visually perceived.

With the above conventional method (1), however, since the motion capture is based on identical copying, a difficulty arises in correction and interruption of motions. In particular, it is difficult to make interactive correction (which is required, for example, in environment including complicated configurations of the ground surface or the presence of an obstacle to correct motions so that the object is avoided from striking against the ground or the obstacle).

Also, in general, size of data recording real-life motions are large. Because those data must be collected and stored beforehand, a repertory of motions capable of being held by a system is also restricted. Further, for operating a motion object in imitation of an imaginary animal, collected data must be modified for adaptation to individual cases if the structure and size of the motion object differ from those of the imaginary animal.

In the above conventional method (2), since action data created by designers is also large in size, there occurs a problem similar to that with the above conventional method (1). The above conventional method (2) also has a disadvantage in that since the action data is subjectively created by the designer, properness of expressed actions is not theoretically ensured, and a burden for producing actions is imposed on the designer.

In the above conventional method (3), a manner of controlling psychological and emotional impressions expressed by actions is not yet realized.

In the field of psychology and dance study, there is known the Laban-Bartenieff-Kestenberg theory for correlating the degree and evolution and growth of the psychological states with features of body actions. The theories of Laban Movement Analysis, Bartenieff Fundamental Theory and Kestenberg Movement Analysis (see references: The Mastery of Movement, Rudolf Laban, Macdonald & Evans, 1960, Body Movement Coping with the Environment, Irmgard Bartenieff et al., Gordon and Breach Publishers, 1980, The Meaning of Movement, Janet Kestenberg Amighi et al., Gordon and Breach Publishers, 1999, and Making connections—Total Body Integration through Bartenieff Fundamentals Peggy Hackney, Gordon and Breach Publishers 1998) have been primarily used to estimate human psychological state from human movements. By utilizing that theory not for emotion estimation but for emotion expression, the inventors have previously proposed a basic idea for automatically producing movements of a motion body, which allow people to feel emotional and psychological expressions from body actions of the motion body (Japanese Patent Application Publication No. 2001-34305 entitled "Controller of Operation Body").

SUMMARY OF THE INVENTION

With the view of improving such a basic idea, it is an object of the present invention to provide a method and apparatus for performing body actions of a motion object, in which fundamental control signals are generated for controlling a series of motions of body groups defined corresponding to plural body components of the motion object, the plural body components being connected through joints with multi-degrees of freedom, and the generated fundamental control signals are distributed for supplying operation signals to the respective body components, thereby causing the motion object to perform body actions as desired.

Also, the present invention provides a method and apparatus for producing operation signals for a motion object, in which a first fundamental control signal representing tonus rhythm is an oscillating numerical value signal, and a second fundamental control signal representing predetermined motions of the body components of the motion object is a signal of a body-group motion sequence, the first fundamental control signal and the second fundamental control signal being combined with each other and distributed at a distribution ratio in accordance with the body-group motion sequence, whereby the operation signals are outputted to the respective body components while reflecting the body-group motion sequence signal and expressing a virtual psychological state as well. The second fundamental control signal can be set depending on a degree of imaginary evolution or growth of the motion object in a role of a living thing.

Further, the present invention provides a method and apparatus for producing operation signals for a motion object, in which, for controlling actions of a motion object presented as a two- or three-dimensional image when an image of the motion object is displayed, at least one image of the motion object is prepared, and at least one operation command signal common to the whole of said motion object or a signal resulting from modifying the at least one common operation command signal are employed as a control signal for changing figure feature parameters of an image representing the body components of the motion object. In these method and apparatus, it is not necessarily required to use a mechanism model of said motion object.

Moreover, the present invention provides a program product containing a program that is read by a computer and causes the computer to produce operation signals for a motion object as set forth above.

According to the present invention, the amount of processing of control/operation data and the amount of stored data can be reduced by controlling predetermined patterns of body actions of the motion object as a body action sequence. Also, movements of the motion object can be performed along with psychological and emotional expressions by producing the fundamental control signal as a body action sequence reflecting the psychological and emotional expressions of the motion object.

BRIEF DESCRIPTION OF THE DRAWINGS

FIG. 1 is a block diagram for explaining a basic concept of an embodiment of the present invention;

FIG. 2 is a table showing examples of a fundamental control signal corresponding to body-action emotional states;

FIG. 3 is a table showing body-group motion sequence fundamental control signals corresponding to evolution and growth stages;

FIG. 5 is a table showing examples of a body-group fundamental control signal corresponding to body-group motion sequences;

FIG. 6 is a table showing relationship correlation between a distribution matrix of operation signals applied to body components and control of each body component of the motion object;

DESCRIPTION OF THE PREFERRED EMBODIMENTS

Figure 4:
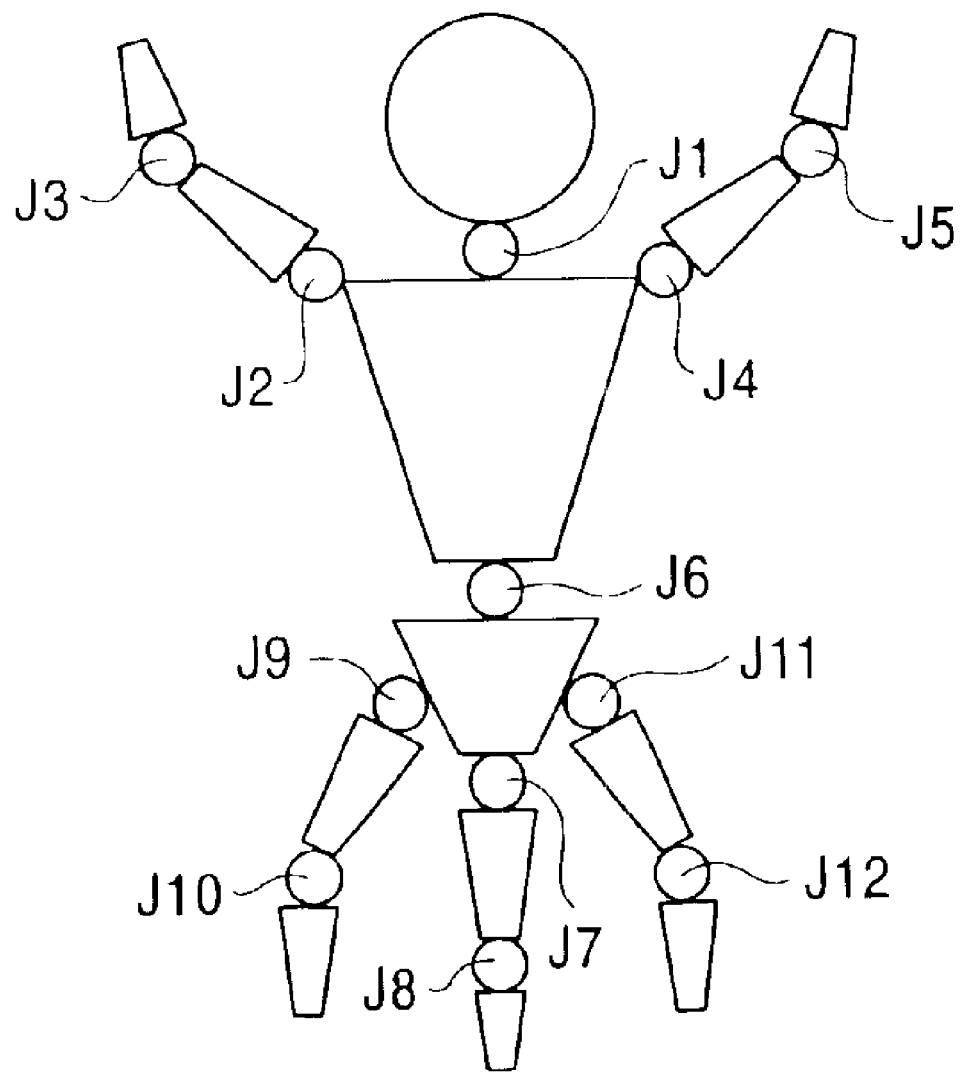
FIG. 4 shows a body structure of a motion object in a basic posture.

Preferred embodiments of the present invention will be described below with reference to the drawings. FIG. 1 is a block diagram for explaining a basic concept of an embodiment of the present invention. The embodiment shown in FIG. 1 is constituted by a system comprising a body action setting unit 1, an emotion fundamental control signal generating unit 2, a body-group motion sequence fundamental control signal generating unit 3, a body group signal distributing unit 4, an operation signal combining unit 5, a body component signal distributing unit 6, and a motion object 7.

In this embodiment, the motion object 7 is operated by producing operation signals to execute actions of body components in accompanying with tonus rhythm motions of a body. A body action sequence of the motion object in accompanying with tonus rhythm is set by the body action setting unit 1. More specifically, a body-action emotional state setting unit 1A and a body action sequence setting unit 1B in the body action setting unit 1 set a predetermined tonus rhythm motion (prototype of motion) of the body and a series of body group motions, respectively, in accordance with a program.

Respective fundamental control signals representing tonus rhythm motions and body-group motion sequences are stored, as fundamental control signal databases, in respective memories 2M, 3M in the emotion fundamental control signal generating unit 2 and the body-group motion sequence fundamental control signal generating unit 3. The emotion fundamental control signal generating unit 2 reads, out of the memory 2M, an emotion fundamental control signal r(t) corresponding to a set action's emotional state and supplies it to the body group signal distributing unit 4. The body group signal distributing unit 4 creates a signal distribution vector $\vec{R}(s)$ from the emotion fundamental control signal r(t). Herein, s is a variable for Laplace transformation and a function containing s represents a Laplace-transformed function.

The body-group motion sequence fundamental control signal generating unit 3 reads, out of the memory 3M, a body-group motion sequence matrix B(s) corresponding to a set action of the body components and supplies it to the operation signal combining unit 5. The operation signal combining unit 5 produces an operation signal vector B(s) $\vec{R}(s)$ and supplies it to the body component signal distributing unit 6. The body component signal distributing unit 6 produces, based on a signal distribution transfer function matrix D(s), an operation signal vector $\vec{P}(s)$ commanded to the respective body components, and then supplies the operation signal vector $\vec{P}(s)$ to the corresponding body components of the motion object 7.

FIG. 2 is a table showing examples (r1 to r10 in FIG. 2) of the fundamental control signal corresponding to body-action emotional states (basic motions, 1 to 10 in FIG. 2), which are set in consideration of the Kestenberg theory for body movement analysis. According to the Kestenberg theory, the tonus rhythm of a muscle depends on the emotional state and the degree of growth. More specifically, the tonus rhythm is divided into 10 stages and the rhythm motion in each divided stage is described along with the meaning thereof. Data of the correspondence table of FIG. 2 and the fundamental control signals is stored in the memory 2M in the emotion fundamental control signal generating unit 2.

FIG. 3 is a table showing examples of the body action sequence, which are obtained by classifying body-group motion sequences in consideration of patterns of the body action sequence based on body action expressions in different stages of evolution and growth according to the Bartenieff theory. According to the Bartenieff theory, patterns of body actions of an animal are fairly depending on the degree of evolution and growth of the animal and the psychological state thereof.

In FIG. 3, a "Breath" action means an action in which the tonus of each muscle and bending/stretching of each joint are performed under synchronization with each other, and directions of joint movements may be at random. A "Core-Support" action means an action in which the tonus of each muscle and bending/stretching of each joint are performed all at once, and directions of joint movements are pointsymmetry about the center of the body. A "Spinal" action means an action in which commands for the tonus of each muscle and bending/stretching of each joint are propagated along the spinal cord. An "Upper-Lower" action means an action in which control of the tonus of each muscle and bending/stretching of each joint are performed separately in an upper half body and a lower half body, and commands for the tonus and the bending/stretching are uniformly executed all at once for each half body. A "Homo-Lateral" action means an action in which control of the tonus of each muscle and bending/stretching of each joint are performed separately in a left half body and a right half body, and commands for the tonus and the bending/stretching are uniformly executed all at once for each half body. A "Contra-Lateral" action means an action in which control of the tonus of each muscle and bending/stretching of each joint are performed separately in two sets of body halves, i.e., one set comprising an upper right half body and a lower left half body and the other set comprising an upper left half body and a lower right half body, and commands for the tonus and the bending/stretching are uniformly executed all at once for each set of body halves.

The memory 3M in the body-group motion sequence fundamental control signal generating unit 3 stores not only a correspondence table showing the relationship between the body action sequences, any of which is set in the body action sequence setting unit P2 depending on the evolution/growth stage (1 to 6 in FIG. 3), and fundamental control signals (B1 to B6), but also data B(s) of the fundamental control signals. While the setting of FIG. 3 shows the body action sequences set in consideration of the Bartenieff theory, body actions expressing the psychological states, etc. may be classified into patterns set in a different way and may be represented by corresponding body-group motion sequences.

FIG. 4 schematically shows an example of a motion object having an explicit mechanism model. In this example, the motion object is made up of body components connected by joints. The motion object is practically realized in the form of a robot or a computer graphic image. The motion object shown in FIG. 4 is in its basic posture, and set body actions of the motion object are performed by actuating respective flexor muscles and joints J1 to J12 associated with the body components. FIG. 5 is a table showing correspondence between the body-group motion sequence signals B1 to B6 shown in FIG. 3 and body groups G1 to G6 for executing those sequences. It is to be noted that the term "body-group motion sequence" used herein means a series of motions combined as one unit for performing a predetermined action of the motion object.

The table of FIG. 5 is stored in the memory 3M in the body-group motion sequence fundamental control signal generating unit 3, and the body-group motion sequence fundamental control signal generating unit 3 outputs data in the signal form of a diagonal matrix. For example, when the action of the motion object is set to the "Breath" action, the fundamental control signals with a weight of 1 or −1 are generated for all the body groups G1 to G6. When it is set to the "Spinal" action, the fundamental control signals are generated for a left shoulder flexor group G2 and a right shoulder flexor group G3 at a time delay of Δt relative to a head flexor group G1, and are generated for a left leg flexor group G4, a right leg flexor group G5 and a tail flexor group G6 at a further time delay of Δt relative to the flexor groups G2 and G3.

FIG. 6 is a table showing an example of correspondence between a matrix for distribution D(s) of operation signals applied to the body components and control of each body component of the motion object. (The signal distribution matrix D(s) is given by expressing the table of FIG. 6, as it is, in the form of a matrix). In the example of FIG. 6, two kinds of control modes are set for each of the body components, and the control modes are implemented by controlling respective flexors and joint angles associated with the body components. For example, a signal inputted to the head flexor G1 is distributed with weights of 1, 0.5, 0.5, 0.5, 0.5 and 1 for the control modes of head nodding, left upper arm internal rotation, left forearm internal rotation, right upper arm internal rotation, right forearm internal rotation, and waist bending, respectively, thereby controlling the flexors and the joints of the head, the left upper arm, the left forearm, the right upper arm, the right forearm, and the waist. The signals supplied to the plurality of body groups are distributed to the body components and then outputted as operation signals for the motion object after being added to respective flexor and joint control signals.

A detailed description is now made of an example in which the motion object is operated by expressing the emotional state of "feel pleasure" with the tonus rhythm of the entire body and by expressing the body action with the body action sequence of the "Spinal" action. For realizing the tonus rhythm expressing the emotional state of "feel pleasure", r(t) given by the following equation (1) is read out of data stored in the memory 2M, which corresponds to 7 in FIG. 2, and is distributed to the body groups G1 to G6 in the body group signal distributing unit 4, thereby creating R(s) given by the following equation (2):

$$r(t) = 0.5\sin(0.5t) \tag{1}$$

$$\vec{R}(s) = L[r(t)] \begin{pmatrix} 1 \\ 1 \\ 1 \\ 1 \\ 1 \\ 1 \end{pmatrix} = \frac{0.25}{s^2 + 0.25} \begin{pmatrix} 1 \\ 1 \\ 1 \\ 1 \\ 1 \\ 1 \end{pmatrix} \tag{2}$$

where L[ ] means Laplace transformation.

The body action sequence corresponding to the set "Spinal" action is read by the body-group motion sequence fundamental control signal generating unit 3 out of the memory 3M as the matrix representing the sequence B(s) given by the following equation (3) in the matrix form. Then, the operation signal combining unit 5 calculates B(s) $\vec{R}(s)$ and outputs it to the body component signal distributing unit 6.

$$B(s) = \begin{pmatrix} 1 & 0 & 0 & 0 & 0 & 0 \\ 0 & \exp(-s) & 0 & 0 & 0 & 0 \\ 0 & 0 & \exp(-s) & 0 & 0 & 0 \\ 0 & 0 & 0 & \exp(-2s) & 0 & 0 \\ 0 & 0 & 0 & 0 & \exp(-2s) & 0 \\ 0 & 0 & 0 & 0 & 0 & \exp(-2s) \end{pmatrix} \tag{3}$$

Based on the stored matrix for signal distribution D(s) shown in FIG. 6, the body component signal distributing unit 6 outputs, as control mode signals for the body components, the operation signals given by $\vec{P}(s) = B(s)\vec{R}(s)$ to the body components. The body components receive the control mode signals and control the flexors and the joint angles in response to the received control mode signals, thereby operating the motion object from the basic posture shown in FIG. 4. Thus, in accordance with the set body action program, the motion object can perform various body actions while expressing virtual psychological states.

While, in the embodiment shown in FIGS. 1 to 6, the operation is controlled based on both expression of the whole body with the tonus rhythm and motion sequences on the body components, it may be controlled based on one of the selection of tonus rhythm and the selection of motion sequences. Further, it is apparent that the body expression can be also applied with tonus rhythms that are captured from real human motions, instead of the tonus rhythm stereotypes that are provided by Kestenberg theory.

Figure 7:
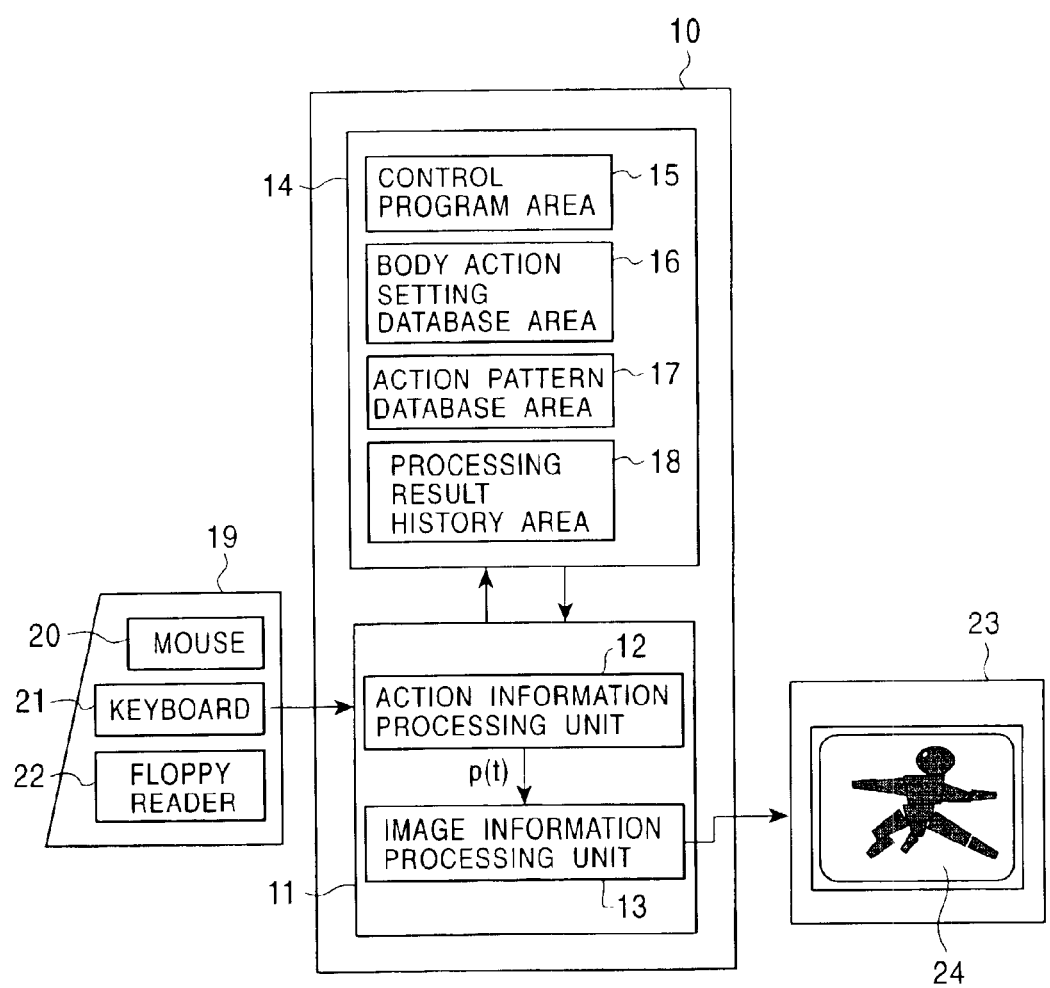
FIG. 7 is a block diagram showing a motion object controller for producing operation signals for a motion object image.

FIG. 7 shows another embodiment of the present invention in which the motion object is a two- or three-dimensional image. The embodiment shown in FIG. 7 is constituted by a system comprising a motion object controller 10, a CPU 11, an action information processing unit 12, an image information processing unit 13, a storage 14, a control program area 15, a body action setting database area 16, an action pattern database area 17, a processing result history memory 18, an input unit 19, a motion object image display 23, and a motion object image 24 (performing the "Spinal" action in FIG. 7). The system also comprises a mouse 20, a keyboard 21, and a floppy reader 22.

The motion object controller 10 is made up of the CPU 11 for executing a control program, and the storage 14 for storing data. The storage 14 includes the control program area 15 for storing the control program for operating the motion object controller 10 in FIG. 7, the body action setting database area 16 for storing the emotional state attribute setting value (P1, e.g., 1 to 10 in FIG. 2) and the growth degree attribute setting value (P2, e.g., 1 to 6 in FIG. 3) of the motion object, the action pattern database area 17 for storing action patterns, and the processing result history memory 18 for storing results of processing of operation data. The data stored in the body action setting database area 16 corresponds to the data stored in both the body-action emotional state setting unit 1A and the body action sequence setting unit 1B shown in FIG. 1, and the data stored in the action pattern database area 17 corresponds to the data B(s) of the fundamental control signals stored in both the memories 2M, 3M shown in FIG. 1.

The CPU 11 is made up of the action information processing unit 12 for processing action data and the image information processing unit 13 for processing information to form an image. The image information processing unit 13 creates a video signal from operation control signals for the motion object outputted from the action information processing unit 12. The motion object image display 23 is constituted by a device for displaying a motion image of the motion object.

An operator enters the emotional state attribute setting value (P1) and the growth degree attribute setting value (P2) of the motion object into the motion object controller 10 through the input unit 19.

The action information processing unit 12 of the CPU 11 loads the motion object attributes sent from the input unit 19 into the body action setting database area 16 and selects the action patterns (i.e., the tonus rhythm and the body action sequence) in match with the attributes by referring to the action pattern database.

Further, the action information processing unit 12 computes motion object posture data in accordance with the selected action pattern while referring to the results of past computations stored in the processing result history memory 18. Then, the action information processing unit 12 outputs a computed result, as an operation signal P(t) for the motion object, to a motion object action controller and, at the same time, stores the computed result in the processing result history memory 18.

When the motion object is an image displayed on the display 23, the motion object posture data of the motion object image per frame is computed and outputted, as an operation signal for the motion object, to the motion object action controller, and simultaneously a computed result per image frame is stored in the processing result history memory 18. Each time the motion object posture data per frame is computed, the action information processing unit 12 transfers the computed motion object posture data to the image information processing unit 13.

The image information processing unit 13 of the CPU 11 computes a color tone of each pixel of the image for expressing the posture of the motion object in accordance with the motion object posture data transferred from the motion information processing unit 12, and then transfers a computed result to the motion object image display 23.

The motion object image display 23 displays the image in accordance with image data transferred from the image information processing unit 13 of the CPU 11. As a result, the motion object image is displayed on the motion object image display 23 in accordance with the control program depending on the entered data while performing body actions in accompanying with the tonus rhythm.

Figure 8:
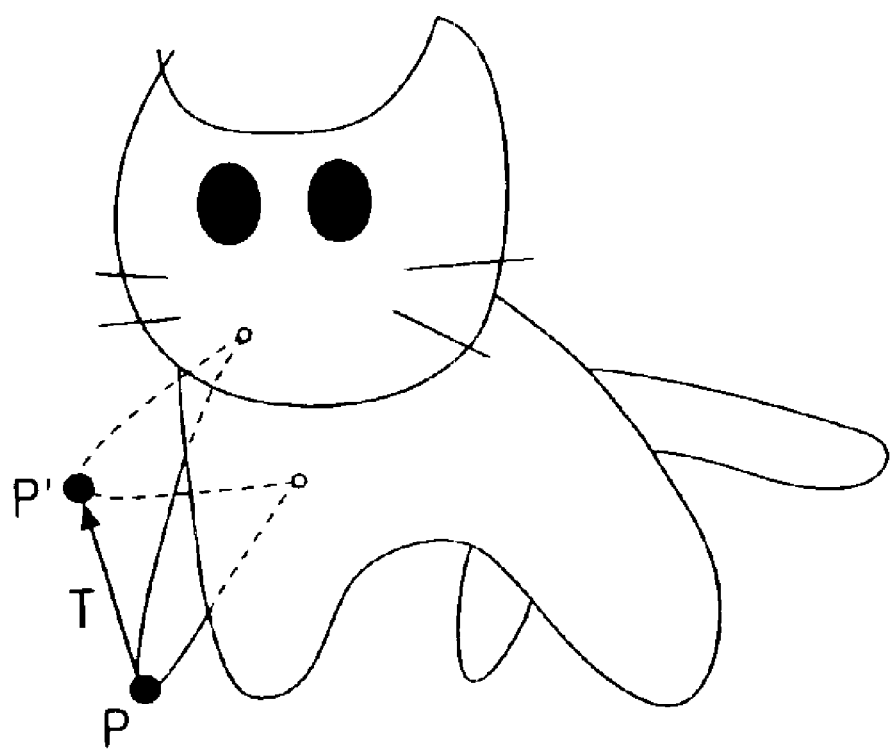
FIG. 8 is a conceptual view for explaining the principle of changing a contour shape of a motion object image that is formed by inputting an image contour by handwriting.

With reference to FIGS. 8 and 9, a description is now made of an embodiment in which body action signals are produced for a motion object image expressed by contours inputted by handwriting. The embodiment will be described in connection with the case in which the motion object is a cat-like motion object image.

FIG. 8 is a conceptual view for explaining the principle of changing a contour shape of a motion object image that is formed by inputting an image contour by handwriting. The contour of the motion object image is formed with the aid of spline curves using drawing software installed in the motion object controller shown in FIG. 7. Accordingly, the contour shape can be changed so as to represent a posture, in which a right hind leg is moved to an outward position expressing movement, by displacing a control point P of the spline curve, which is a parameter for a figure feature of a body portion of the motion object image, to P' through a distance T. (It is to be noted that fixed edge nodes of the contour of the body portion are hidden.)

Also, an image representing a novel posture of the motion object can be produced by performing operations, such as rotation, displacement, scale-up/down and change of color tones, on the displayed contour and figure elements of an original image. Thus, for an image expression of even a motion object not having an explicit mechanism model, images showing a series of actions of the motion object can be formed by changing visual features of the motion object image.

Figure 9A:
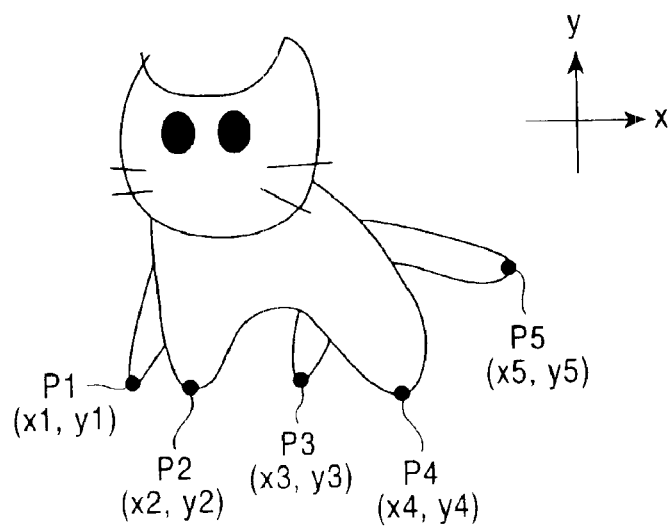
FIGS. 9A, 9B and 9C are schematic views showing postures of the motion object image of FIG. 8 in different actions.
Figure 9B:
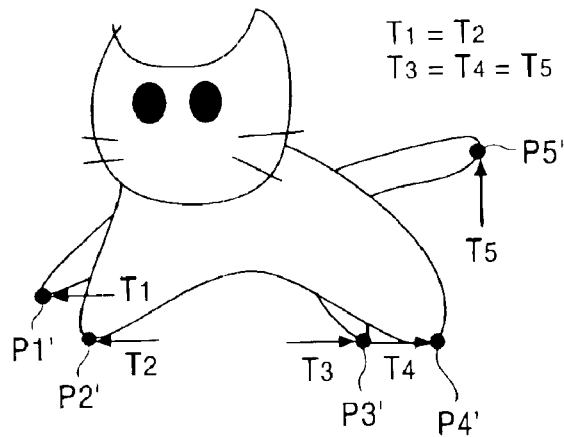
Figure 9C:
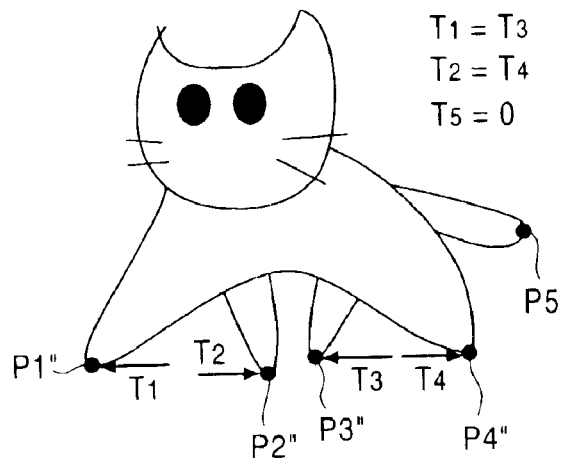

FIGS. 9A, 9B and 9C are schematic views for explaining changes in posture of the cat-like motion object image inputted by handwriting. FIG. 9A represents the basic posture, and FIGS. 9B and 9C represent action examples of the cat-like motion object, which are resulted by changing the basic posture shown in FIG. 9A. More specifically, the contours of arms and legs in the basic posture of the cat-like motion object are drawn, as shown in FIG. 9A, with spline curves having control points at distal ends of the motion object image. P1, P2, P3, P4 and P5 in FIG. 9A are control points of the spline curves representing a right hind leg contour, a right foreleg contour, a left hind leg contour, a left foreleg contour, and a tail contour, respectively. It is here assumed that an xy-coordinate system is set as shown in FIG. 9A, and xy-coordinate values of P1, P2, P3, P4 and P5 are expressed respectively by (x1, y1), (x2, y2), (x3, y3), (x4, y4) and (x5, y5).

For the right hind leg, an image representing the inwardly bent leg can be formed by displacing the end point p1 in the positive direction of x. Conversely, an image representing the outwardly stretched right hind leg can be formed by displacing the end point p1 in the negative direction of x.

Here, a value of the x-coordinate $x_1$ of P1 in an original image is assumed to be $x_{10}$. Also, a difference $\Delta x_1$ in x-coordinate between $x_1$ and the original image is defined herein by the following equation (4). When $\Delta x_1$ has a large positive value, the right hind leg is inwardly bent, and when $\Delta x_1$ has a large negative value, the right hind leg is outwardly stretched. Thus, a "bending/stretching degree T1 of the right hind leg" is defined by the following equation (5).

$$\Delta x_1 = x_1 - x_{10} \quad (4)$$

$$T_1 = \Delta x_1 = x_1 - x_{10} \quad (5)$$

Similarly, bending/stretching degrees T2, T3, T4 and T5 of the left foreleg, the right foreleg, the left hind leg, and the tail are defined by the following equations (6). In the equations (6), $x_{20}$, $x_{30}$, $x_{40}$ and $y_{50}$ are respectively coordinate values of $x_2$, $x_3$, $x_4$ and $y_5$ in the original image.

$$\left.\begin{array}{l} T_2 = x_2 - x_{20} \\ T_3 = -(x_3 - x_{30}) \\ T_4 = -(x_4 - x_{40}) \\ T_5 = x_5 - x_{50} \end{array}\right\} \quad (6)$$

As patterns of the body actions, the "Upper-Lower" action and the "Homo-Lateral" action are defined as follows.

The "Upper-Lower" action represents a set of motions satisfying:

$T_1 = T_2$ and $T_3 = T_4 = T_5$

The "Homo-Lateral" action represents a set of motions satisfying:

$T_1 = T_3$, $T_2 = T_4$ and $T_5 = 0$

When the degree of growth/development of the motion object is set to the stage of 6 months after birth, the action of the motion object is produced as the "Upper-Lower" action, and when the degree of growth/development of the motion object is set to the stage of 1 year after birth, the action of the motion object is produced as the "Homo-Lateral" action (see FIG. 3).

In the case in which the emotional state of the motion object is set to "safety", T=2 sin(0.3t) is selected as the fundamental control signal T, and in the case in which the emotional state of the motion object is set to "exciting", T=4 sin(0.9t) is selected (see FIG. 2).

For example, when the degree of growth/development of the motion object is set to the stage of 6 months after birth, the "Upper-Lower" action is selected as the pattern of the body action, and when the emotional state of the motion object is set to "safety", $T = 2 \sin(0.3t)$ is selected as the fundamental control signal. Therefore, displacements of the control points of the image are decided with calculations expressed by the following equations (7) and (8), and images representing a series of motions are produced as shown in FIG. 9B.

$$\left.\begin{array}{l} T_1 = T_2 = 2\sin(0.3\ t) \\ T_3 = T_4 = T_5 = 2\sin(0.3\ t) \end{array}\right\} \quad (7)$$

$$\left.\begin{array}{l} P_1 = (x_1, y_1) = (T_1 + x_{10}, y_{10}) = (2\sin(0.3\ t) + x_{10}, y_{10}) \\ P_2 = (x_2, y_2) = (T_2 + x_{20}, y_2) = (2\sin(0.3\ t) + x_{20}, y_{20}) \\ P_3 = (x_3, y_3) = (-T_3 + x_{30}, y_{30}) = (-2\sin(0.3\ t) + x_{30}, y_{30}) \\ P_4 = (x_4, y_4) = (-T_4 + x_{40}, y_{40}) = (-2\sin(0.3\ t) + x_{40}, y_{40}) \\ P_5 = (x_5, y_5) = (x_{50}, T_5 + y_{50}) = (x_{50}, 2\sin(0.3\ t) + y_{50}) \end{array}\right\} \quad (8)$$

Also, for example, when the degree of growth/development of the motion object is set to the stage of 1 year after birth, the "Homo-Lateral" action is selected as the pattern of the body action, and when the emotional state of the motion object is set to "exciting", $T = 4 \sin(0.9t)$ is selected as the fundamental control signal. Therefore, displacements of the control points of the image are decided with calculations expressed by the following equations (9) and (10), and images representing a series of motions are produced as shown in FIG. 9C.

$$\left.\begin{array}{l} T_1 = T_3 = 4\sin(0.9\ t) \\ T_2 = T_4 = 4\sin(0.9\ t) \\ T_5 = 0 \end{array}\right\} \quad (9)$$

$$\left.\begin{array}{l} P_1 = (x_1, y_1) = (T_1 + x_{10}, y_{10}) = (4\sin(0.9\ t) + x_{10}, y_{10}) \\ P_2 = (x_2, y_2) = (T_2 + x_{20}, y_2) = (4\sin(0.9\ t) + x_{20}, y_{20}) \\ P_3 = (x_3, y_3) = (-T_3 + x_{30}, y_{30}) = (-4\sin(0.9\ t) + x_{30}, y_{30}) \\ P_4 = (x_4, y_4) = (-T_4 + x_{40}, y_{40}) = (-4\sin(0.9\ t) + x_{40}, y_{40}) \\ P_5 = (x_5, y_5) = (x_{50}, T_5 + y_{50}) = (x_{50}, y_{50}) \end{array}\right\} \quad (10)$$

Furthermore, an operation signal producing program for producing the operation signals for the motion object can be stored in the storage 14 of the motion object controller 10 shown in FIG. 7 so that the above-described method of the present invention is executed by the motion object controller 10. The operation signal producing program is stored in the storage 14 with key-input from the keyboard, read from a floppy on which the program is recorded, or installation.

What is claimed is:

1. A method of producing operation signals for a motion object, the method comprising the steps of:
   for controlling actions of a motion object presented as a two- or three-dimensional image, preparing at least one image of said motion object, creating an image having visual features changed from visual features of said one image, and providing a series of action images of said motion object to a display; and
   employing, as a control signal for changing figure feature parameters of an image, at least one operation command signal common to the whole of said motion object or a signal resulting from synthesizing the at least one common operation command signal by a modification signal.

2. An apparatus for producing operation signals for a motion object, the apparatus comprising:
   first body action setting means for setting at least one parameter representing imaginary emotion of said motion object;
   second body action setting means for setting at least one parameter representing imaginary state of development of said motion object;

first fundamental control signal generating means for receiving a setting signal from said first body action setting means and generating a corresponding oscillating numerical value signal;

means for distributing the first fundamental control signal to body groups;

second fundamental control signal generating means for receiving a setting signal from said second body action;

setting means and generating a second fundamental control signal representing a body-group motion sequence to perform a corresponding action;

means for combining said first fundamental control signal and said second fundamental control signal distributed to the body groups; and distributing means for distributing a combined fundamental control signal to body components related to an action set by said second body action setting means at a corresponding distribution transfer function of said second fundamental control signal.

3. An apparatus for producing operation signals for a motion object according to claim 2, wherein said first fundamental control signal is a signal in the form of a trigonometric wave, triangular wave or random-walk drift wave, or a signal resulting from multiplying any of those waves by an appropriate time function.

4. An apparatus for producing operation signals for a motion object according to claim 2 or 3, wherein said second fundamental control signal is a predetermined body-group motion sequence signal for setting a body action determined depending on a degree of imaginary evolution or imaginary growth of said motion object.

5. An apparatus for producing operation signals for a motion object according claim 2 to 3, wherein said second fundamental control signal is a predetermined body-group motion sequence signal for setting one of "Breath", "Core-Support", "Spinal", "Upper-Lower", "Homo-Lateral", and "Contra-Lateral" actions based on classifications of action patterns according to the Bartenieff theory.

6. An apparatus for producing operation signals for a motion object according claim 2, wherein the distribution set by said distributing means is expressed by a function in the time domain.

7. An apparatus for producing operation signals for a motion object, the apparatus comprising a CPU and a storage, said storage storing an action setting database, an action pattern database, and processing result history data, said CPU including an action information processing unit for executing the steps of:

for controlling actions of said motion object presented as a two- or three-dimensional image, preparing at least one image of said motion object, creating an image having visual features changed from visual features of said one image, and storing the created image as the processing result history data; and employing, as a control signal for changing figure feature parameters of an image, at least one operation command signal common to the whole of said motion object or a signal resulting from multiplying the at least one common operation command signal by a modification signal, said CPU further including an image information processing unit for creating and outputting a video image to present an image on a display.

8. A program product containing a program for producing operation signals for a motion object, the program being read by a computer and causing the computer to function as:

means for generating a fundamental control signal for controlling a series of motions of body groups defined corresponding to plural body components of the motion object; and means for distributing the fundamental control signal to produce operation signals for controlling the respective body components, wherein said fundamental control signal consists of a first fundamental control signal representing tonus rhythm of the whole body of the motion object and a second fundamental control signal representing distributions of motion data over the body components of the motion object, said first fundamental control signal is an oscillating numerical value and said second fundamental control signal is a signal of a body-croup motion sequence of, said first fundamental control signal and said second fundamental control signal being combined with each other and distributed through numerical process in accordance with the body group motion sequence.

* * * * *